United States Patent
Matson et al.

[19]

[11] Patent Number: 6,144,228
[45] Date of Patent: Nov. 7, 2000

[54] GENERALIZED PUSH-PULL CASCODE LOGIC TECHNIQUE

[75] Inventors: Mark D. Matson, Acton; Sridhar Samudrala, Westboro; Robert J. Dupcak, Framingham, all of Mass.

[73] Assignee: Compaq Computer Corporation, Houston, Tex.

[21] Appl. No.: 09/340,774

[22] Filed: Jun. 28, 1999

Related U.S. Application Data

[60] Provisional application No. 60/118,130, Feb. 1, 1999.
[51] Int. Cl.[7] ............................................... H03K 19/0948
[52] U.S. Cl. ............................................. 326/121; 326/83
[58] Field of Search ................................... 326/121, 112, 326/83

[56] References Cited

U.S. PATENT DOCUMENTS

| | | | |
|---|---|---|---|
| 4,833,347 | 5/1989 | Rabe | 307/443 |
| 5,023,480 | 6/1991 | Gieseke et al. | 307/448 |
| 5,309,043 | 5/1994 | Murahashi | 307/451 |

OTHER PUBLICATIONS

Heller, Griffin, et al., "Cascode Voltage Switch Logic: A Differential CMOS Logic Family," IEEE International Solid State Circuits Conference, Feb. 1984, pp. 16–17.

*Primary Examiner*—David Nelms
*Assistant Examiner*—M. Tran
*Attorney, Agent, or Firm*—Hamilton, Brook, Smith & Reynolds, P.C.

[57] ABSTRACT

A method and apparatus are presented for efficient implementation of logic and arithmetic functions that generate sets of mutually exclusive output signals. Such a logic family includes a network of NMOS transistors that implements a desired logic function. Coupled to that network is a minimal number of PMOS devices for providing logic level restoration and for compensating for any voltage drops due to the NMOS transistors. With such a structure, the speed, area and power consumption characteristics of logic functions are improved.

42 Claims, 10 Drawing Sheets

GENERALIZED PUSH-PULL CASCODE LOGIC TECHNIQUE

RELATED APPLICATIONS

This application claims the benefit of U.S. Provisional Application, entitled "A Generalized Push-Pull Cascode Logic Technique" by Mark Matson et al. (Serial No. 60/118, 130 filed on Feb. 1, 1999) that is incorporated by reference herein.

BACKGROUND OF THE INVENTION

Generally speaking, computer systems typically include one or more central processor units (CPUs). Such CPUs typically include circuits for performing logical and arithmetic operations on data elements stored in main memory. Those circuits are designed such that each possible combination of data elements causes the assertion of only one selected output signal that is part of a group of output signals. In other words, such circuits produce outputs that are asserted in a mutually exclusive manner.

For example, when operands are added in a CPU's arithmetic logic circuit, the overall addition operation is performed as a series of smaller addition operations. Such an addition operation typically begins by adding a least significant portion of each operand using a first arithmetic or "adder" circuit. That adder circuit produces a sum value and a carry-out value. That sum value becomes the least significant portion of the overall sum value. The carry-out value is conveyed to a second adder circuit that adds it to a more significant portion of each operand to form another sum value and another carry-out value. Such intermediate addition operations are performed until all of the bits of the operands have been added together and the overall sum and carry-out value have been computed.

As is known in the art, the overall addition operation can be more quickly performed when the carry values are calculated in parallel. Such carry values are represented by mutually exclusive signals indicating what is to be done with that carry signal, rather than rippling the carry signal through each adder circuit. Such mutually exclusive signals are referred to as carry status signals and are utilized by carry lookahead adder circuits.

Carry status signals can represent three possible conditions that arise with respect to carry-out values. Those conditions are referred to as "generate", "kill" and "propagate" conditions. An adder circuit "generates" a carry-out value when it adds two operands that produce a resulting sum value having a component that is to be added to the next most significant operands. For example, consider a one bit adder than adds a logical "one" to another logical "one". The result is a sum value of zero and a carry out component of one. Such a carry out component is represented by the assertion of a "generate" carry status signal.

Second, when an adder circuit does not produce a carry-out value, it is referred to as having "killed" the carry value. For example, consider that the one bit adder adds a logical "zero" to another logical "zero". The result is a sum value of zero and a carry out component of zero. Such a carry out component is represented by the assertion of a "kill" carry status signal.

Lastly, where an adder circuit receives a carry-in value from a less significant adder circuit and the associated addition operation causes the creation of an identical carry-out value, the adder circuit is said to "propagate" the carry signal. For example, consider that the one bit adder adds a logical "one" to a logical "zero" and a logical "one" carry in value. The result is a sum value of zero and a carry out component of one. The carry out component is the same as the carry in value and therefore is referred to as being propagated.

Such mutually exclusive generate, kill and propagate signals are generated by each adder in parallel and are aggregated by a carry lookahead circuit to form an overall carry value for the entire addition operation.

In the prior art, circuits that produce such mutually exclusive output signals were difficult to implement because they were slow and/or required a large amount of semiconductor real estate. Such a result flows from the fact that such circuits were typically designed using either the full complementary CMOS logic family, the dynamic CMOS logic family, or the pseudo-NMOS logic family.

When the generate, kill and propagate signals are combined in a carry lookahead circuit implemented using the full complementary CMOS logic family, each of the input signals is connected to the gate terminals of both an NMOS transistor and a PMOS transistor. Accordingly, such an approach requires the implementation of a large number of PMOS transistors. PMOS transistors can significantly slow down the operation of a circuit since they have lower conductance and induce significant levels of parasitic capacitance. As such, logic families that require the use of a large number of PMOS transistors are not desired.

The standard dynamic CMOS logic family has also been used to implement such circuits. Circuits designed using the standard dynamic CMOS logic family couple the input signals only to NMOS transistors. The NMOS transistors can only pull internal signals of the circuit to logic low levels in response to an assertion of the input signal. Therefore, circuits designed using this logic family require a pre-charge device for returning them to logic high levels between evaluation operations. Pre-charge devices are implemented using PMOS transistors coupled to a Vdd voltage supply (Vdd). As such, the standard dynamic CMOS logic family allows logic circuits to be implemented using fewer PMOS transistors and therefore offers potential speed and area advantages over the full complementary CMOS logic family. However, such a logic family has a higher power consumption, is more susceptible to electrical disturbances and restricts the behavior of input signals. Consequently, dynamic logic is often undesirable.

Further, the pseudo-NMOS logic family requires that input signals are connected only to NMOS transistors that form conductive paths to electrical ground (Vss). Associated paths to Vdd are provided by relatively weak PMOS transistors, each having a gate terminal coupled to Vss. Accordingly, circuit paths are only weakly pulled up to logic high levels such that they can be pulled down by an associated NMOS transistor that has been turned-on.

Implementation of a circuit using the pseudo-NMOS logic family allows fewer transistors to be implemented, thereby reducing the amount of semiconductor real-estate that is used. However, such circuit implementations typically consume significant amounts of power. That power drain is due to the fact that when the NMOS transistors are turned-on, a path is generated that allows current to flow from Vdd to Vss. While such a power drain may not be significant with regards to a single circuit, such design methodologies are typically used to design many replicated versions of the same circuit. Accordingly, this logic family is not desired due to its significant power consumption characteristics.

Therefore, the logic families used in the prior art present undesirable tradeoffs of speed, semiconductor area and power consumption that have to be weighed before a circuit is implemented.

SUMMARY OF THE INVENTION

Generally, a method and apparatus are presented for efficient implementation of logic and arithmetic functions that generate sets of mutually exclusive output signals. Such a logic family includes a network of NMOS transistors that implements a desired logic function. Coupled to that network is an output stage containing a minimal number of PMOS devices for providing logic high levels to the associated output signals. Such a structure offers speed, area, and power advantages relative to the prior art and therefore more optimal design solutions in many applications.

With a preferred embodiment of the invention a logic family is provided that is used to implement circuits that generate sets of mutually exclusive output signals. That logic family includes a network of NMOS devices that implement a desired logic function. The desired logic function produces a number of output signals that are asserted in a mutually exclusive manner. Those mutually exclusive output signals are conveyed to a configuration of PMOS devices. The PMOS devices are used to raise the de-asserted output signals to logic high levels. The number of PMOS devices per output signal can be equivalent to one less than the number of output signals.

The PMOS transistor devices that are associated with a single output signal are connected in such a manner that each gate terminal is coupled a different one of the other output signals. Additionally, a drain and a source terminal of each PMOS device are coupled to the output signal to which it is associated and the power supply voltage, respectively.

With another aspect of the preferred embodiment, each of the output signals can be connected to an inverter or other logic gate for buffering them before they are conveyed to other logic circuits. Also, a number of latch devices can be associated with each one of the output signals for pulling them to a logic low level when the remaining output signals are asserted. Such latches each include a number of serially connected NMOS devices. The number of NMOS devices per output signal is equivalent to one less than the number of output signals. For example, if there are three output signals then a pair of serially connected NMOS devices will be connected to each output signal. The gate terminal of each NMOS device is coupled to each of the output signals except the one to which it is associated. Accordingly, such a structure includes a first NMOS device having a drain terminal coupled to the associated output signal The network of NMOS devices can implement, for example, a logic function for aggregating carry status signals from a plurality of adder circuits. Those carry status signals can indicate propagate, generate and kill status of an associated carry signal in a mutually exclusive manner.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

I. A Computer System

Figure 1:
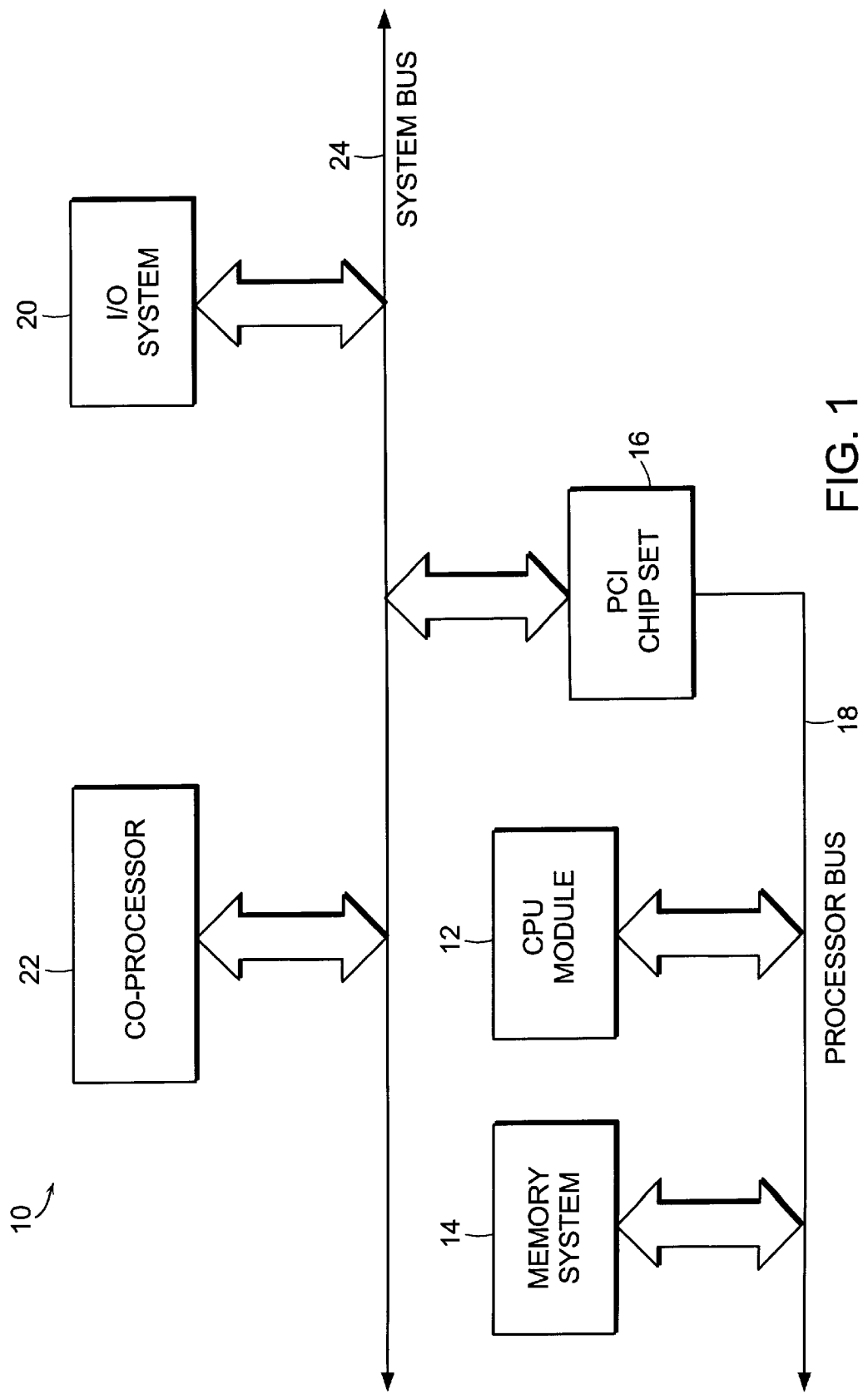
FIG. 1 is a schematic drawing of a computer system including a central processing module, in which the present invention can be used.

FIG. 1 is a schematic diagram of a computer system 10 that includes a central processing unit (CPU) module 12, a memory system 14 and a PCI chip set 16 connected by a processor bus 18. The PCI chip set 16 is further connected to an I/O system 20 and a co-processor module 22 by a system bus 24.

Figure 2:
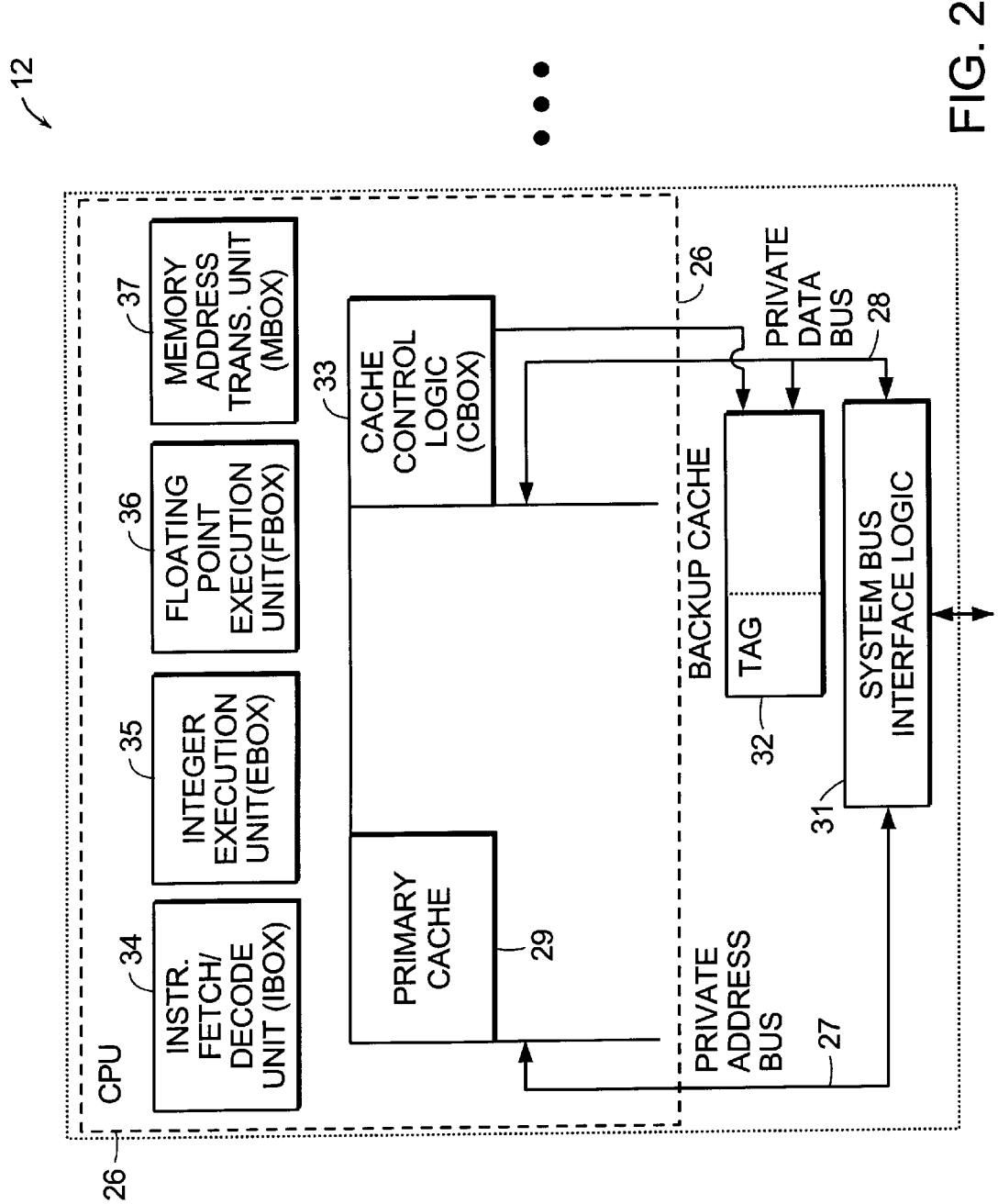
FIG. 2 is a schematic diagram of the central processing module of FIG. 1.

Referring now to FIG. 2, central processing module 12 is shown to include a CPU 26. A private address bus 27 and a private data bus 28 within CPU 26 connects a primary cache 29 and a system bus interface 31. The private data bus 28 connects the CPU 26 to a backup cache (Bcache) 32 that, along with the primary cache 29, is controlled by the Cache Control and Bus Interface unit 33.

CPU 26 further includes several logic circuits that enable it to perform the major operations that the computer system 10 requires. The Ibox 34, or Instruction Fetch and Decode Unit, controls instruction prefetching, instruction decoding, branch prediction, instruction issuance, and interrupt handling. The Ebox 35, or Integer Execution Unit, handles the functions of addition, shifting, byte manipulation, logic operations, and multiplication for integer values stored in the system. Arithmetic operations, for floating point values, are controlled by the Fbox 36, or Floating Point Execution Unit. The Mbox 37, or Memory Address Translation Unit, translates virtual addresses, generated by programs running on the system, into physical addresses which are used to access locations in the computer system. Lastly, the Cbox 33, or Cache Control and Bus Interface Unit, controls the primary cache 29 and backup cache 32. It also controls the private data bus, private address bus, memory related external interface functions, and all accesses initiated by the Mbox 37.

Figure 3:
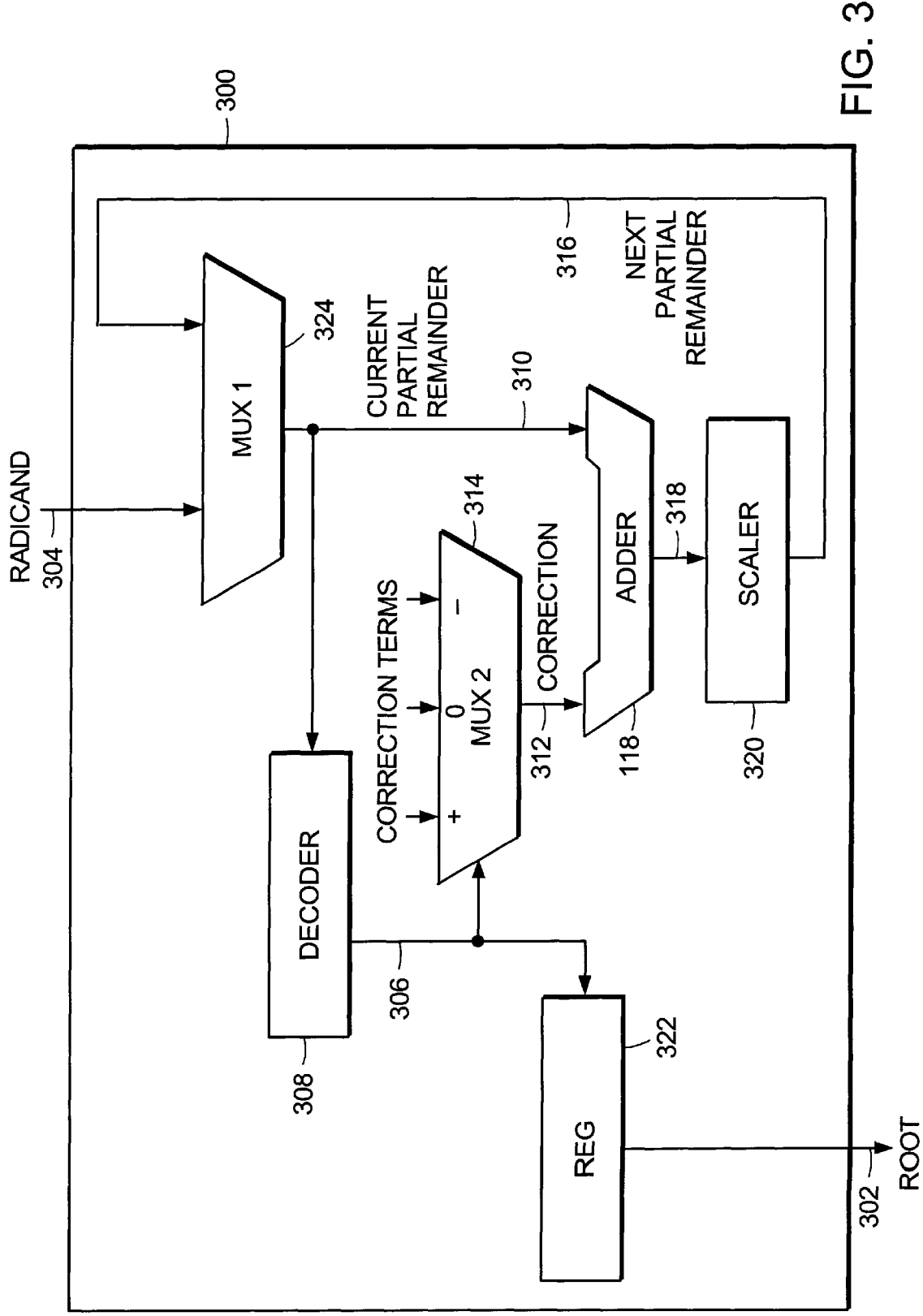
FIG. 3 is a block diagram of a square root circuit of the central processing module of FIG. 2.

FIG. 3 shows a block diagram of a square root unit 300 located in the Floating Point Execution Unit 36. Generally, the square root unit 300 computes a root 302 for a radicand 304 by computing one root digit 306 per iteration of the square root unit 300. In each iteration of the square root unit 300, the root digit 306 is computed in the decoder 308 dependent upon a current partial remainder 310. A succeeding or next partial remainder 316 is computed by adding the correction term 312 to the current partial remainder 310 in an adder 118, and scaling the result of the addition in a scaler 320.

II. An adder carry chain that produces mutually exclusive output signals

Figure 4:
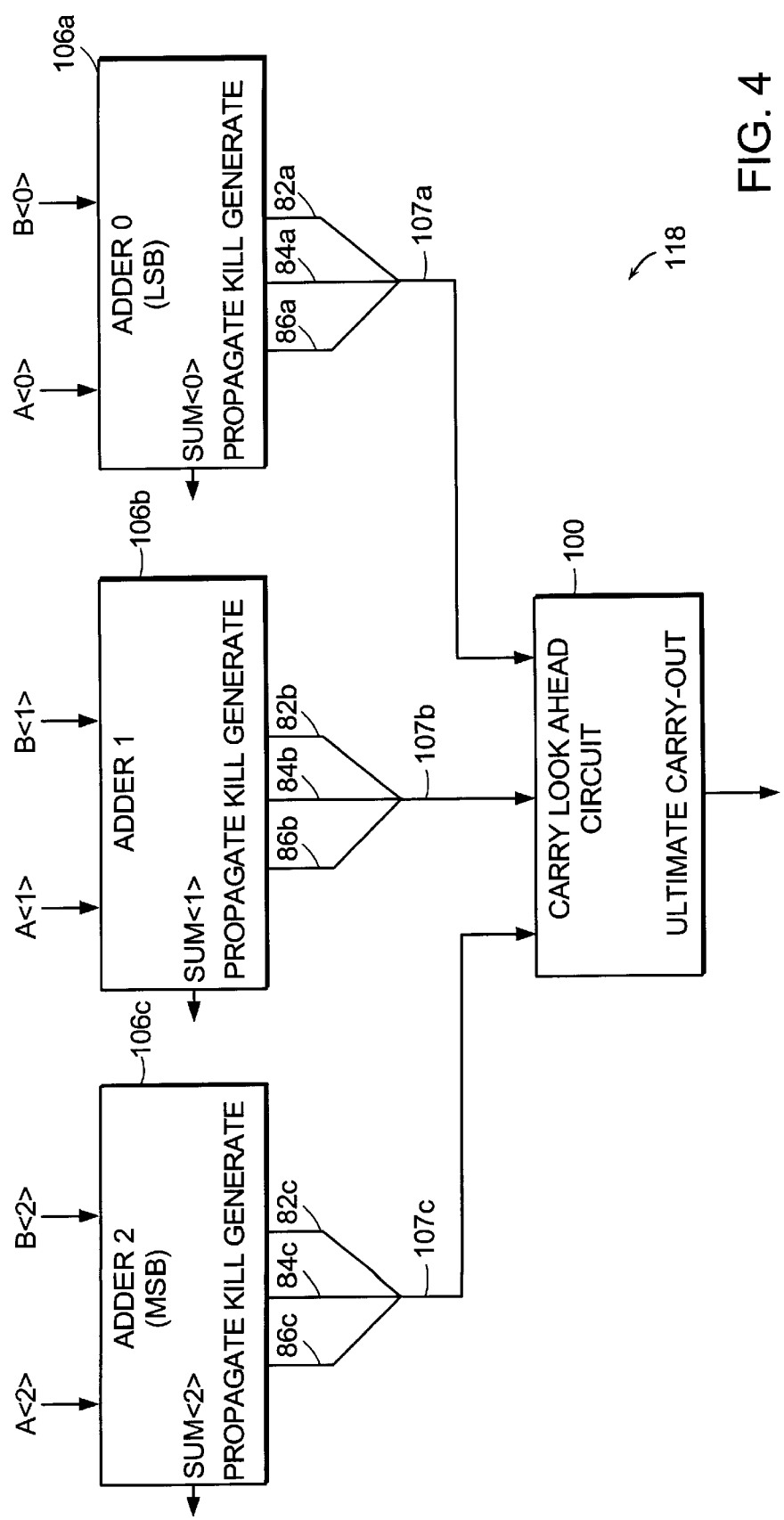
FIG. 4 is a block diagram of the adder circuit of the square root circuit of FIG. 3.

FIG. 4 is a block diagram of an adder carry chain contained within adder 118 of FIG. 3. Adder 118 performs an addition operation using a collection of adder circuits 106a–106c that each compute only a portion of the overall sum value. Each of those adder circuits 106a–106c produces carry status information 107 that indicates whether a carry-out value will result from a particular addition operation. That carry status information 107 includes three signals 82, 84 and 86 that represent three carry status conditions (i.e., generate, kill and propagate).

Each adder circuit 106a–106c asserts one of the carry status signals 82-86 when it calculates a sum value. The carry status signals for each adder circuit 106a–106c are calculated in parallel and are aggregated by a carry lookahead circuit 100. For example, when an adder circuit adds two operands and a carry-in value, it produces a sum and a carry-out value. When the generate signal 82 is asserted, the adder's carry-out value is a logical one. Likewise, when the kill signal 84 is asserted, the carry-out value is a logical zero. Lastly, when the carry-out value is the same as the carry-in value, the adder circuit is said to "propagate" the carry signal. When the propagate signal 86 is asserted, the carry-out value is the same as the carry-in value. The carry status signals produced by each adder circuit are subsequently combined, or aggregated, by a carry lookahead circuit 100 to form an overall carry-out value for the entire add operation. The following table outlines the situations that cause each of the carry status signals to be asserted. It will be recognized by one of ordinary skill in the art that the carry status signals (generate, kill and propagate) 82-86 are asserted in a mutually exclusive manner.

| Carry Status Signals | | | |
|---|---|---|---|
| Generate | Kill | Propagate | Carry-Out |
| 1 | 0 | 0 | 1 |
| 0 | 1 | 0 | 0 |
| 0 | 0 | 1 | Carry out value same as carry-in value |

As it is known in the art, such carry lookahead circuits are typically designed using logic families referred to as full complementary CMOS logic, dynamic CMOS logic, pass transistor logic or pseudo NMOS logic. However, such logic families require tradeoffs between speed, semiconductor area and power consumption.

III. The generalized push-pull cascode logic family

Figure 5:
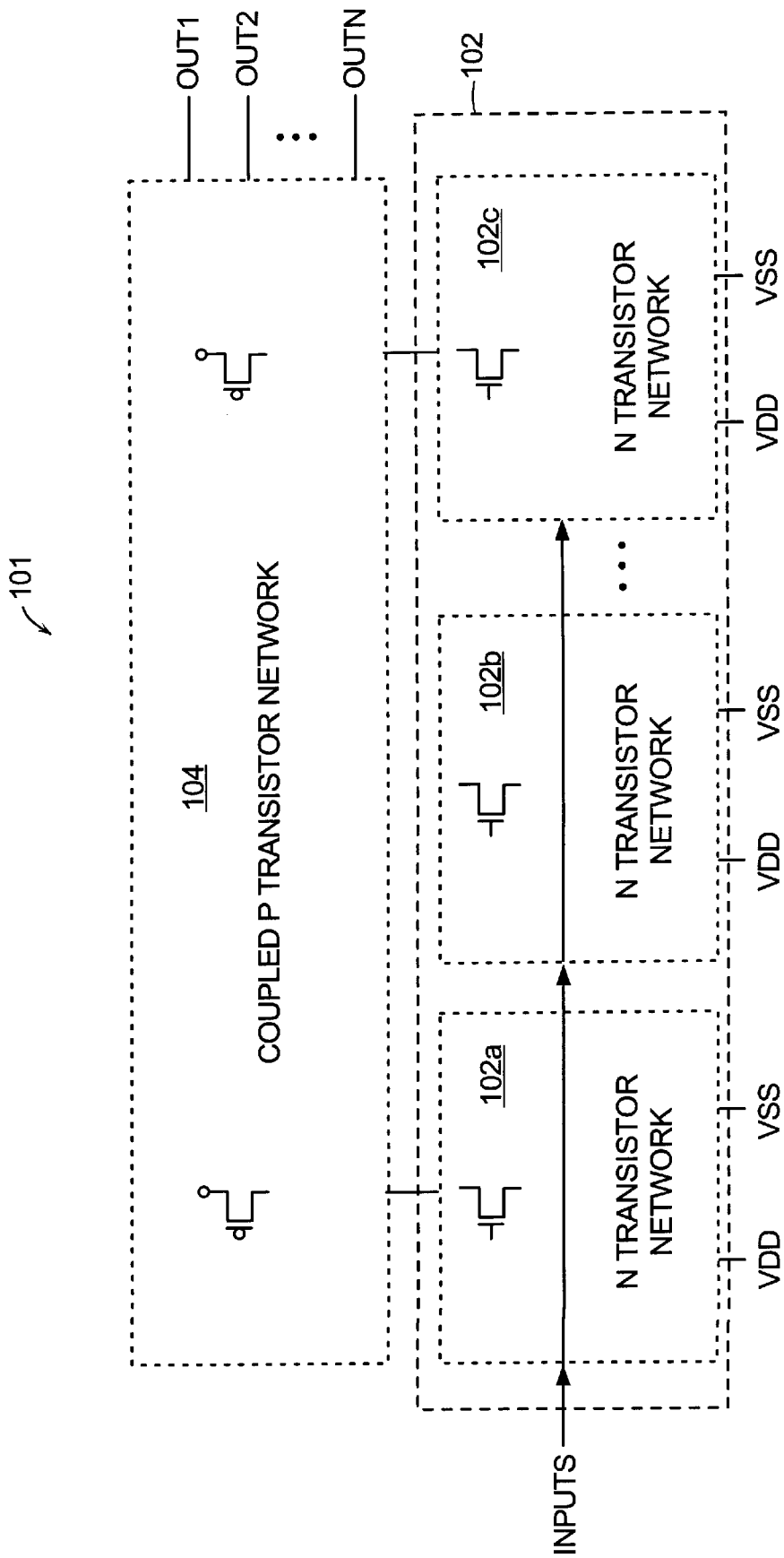
FIG. 5 is a block diagram of a push-pull cascode logic family used to implement the adder circuit of FIG. 4.

Referring now to FIG. 5, a block diagram depicts an inventive logic family 101 that is well suited for logic circuits that generate mutually exclusive output signals such as carry lookahead circuits. Logic family 101 is referred to as the "generalized push-pull cascode logic family" and includes a series of logic networks or circuits 102a–102c that implement a desired logic function using only NMOS transistor devices. A specifically configured output circuit 104, implemented using a minimal number of PMOS transistor devices, is coupled to each of the NMOS logic circuits 102 to provide logic level restoration, as will be described below.

Generally, logic functions that generate a plurality of mutually exclusive output signals can be implemented using the generalized push-pull cascode logic family in a significantly more efficient manner than is available using prior art logic families. Unlike prior art logic families, an embodiment of the present invention allows such logic functions to be implemented using a minimal number of PMOS devices. Accordingly, because such PMOS devices are relatively large, the above mentioned circuits can be implemented using less semiconductor real estate. Further, because PMOS devices are associated with large amounts of parasitic capacitance, operating speed and performance of the above mentioned circuits are increased.

As previously stated, the generalized push-pull cascode logic family 101 includes at least one logic circuit 102 that implements a desired logic function using only NMOS transistor devices. Each of the outputs of logic circuit 102 are asserted in a mutually exclusive manner. Output circuit 104 includes a number of PMOS transistor devices coupled to each of the outputs of NMOS logic circuits 102, so that output signals having logic high values are fully transitioned to Vdd. The number of PMOS transistor devices that are coupled to each of the outputs of NMOS logic circuits 102 is equivalent to one less than the number of mutually exclusive output signals of logic circuit 102. Each PMOS transistor device that is connected to a given output signal has a gate terminal that is connected to a different one of the other output signals.

For illustration purposes consider that logic circuit 102 includes three mutually exclusive output signals. Accordingly, the output of NMOS logic circuit 102a is coupled to two PMOS transistor devices in output circuit 104. The gate terminal of one of those transistors is connected to the output of NMOS logic circuit 102b and the other gate terminal would be connected to the output of NMOS logic circuit 102c. Because the output signals are mutually exclusive, it is certain that when the output signals from logic circuits 102b and 102c de-assert to logic high levels, the output signal from logic circuit 102a asserts to a logic low level. The asserted logic level turns-on PMOS transistors coupled to each of the other output signals, thereby strongly de-asserting them by providing a path to the Vdd power supply voltage.

Figure 6:
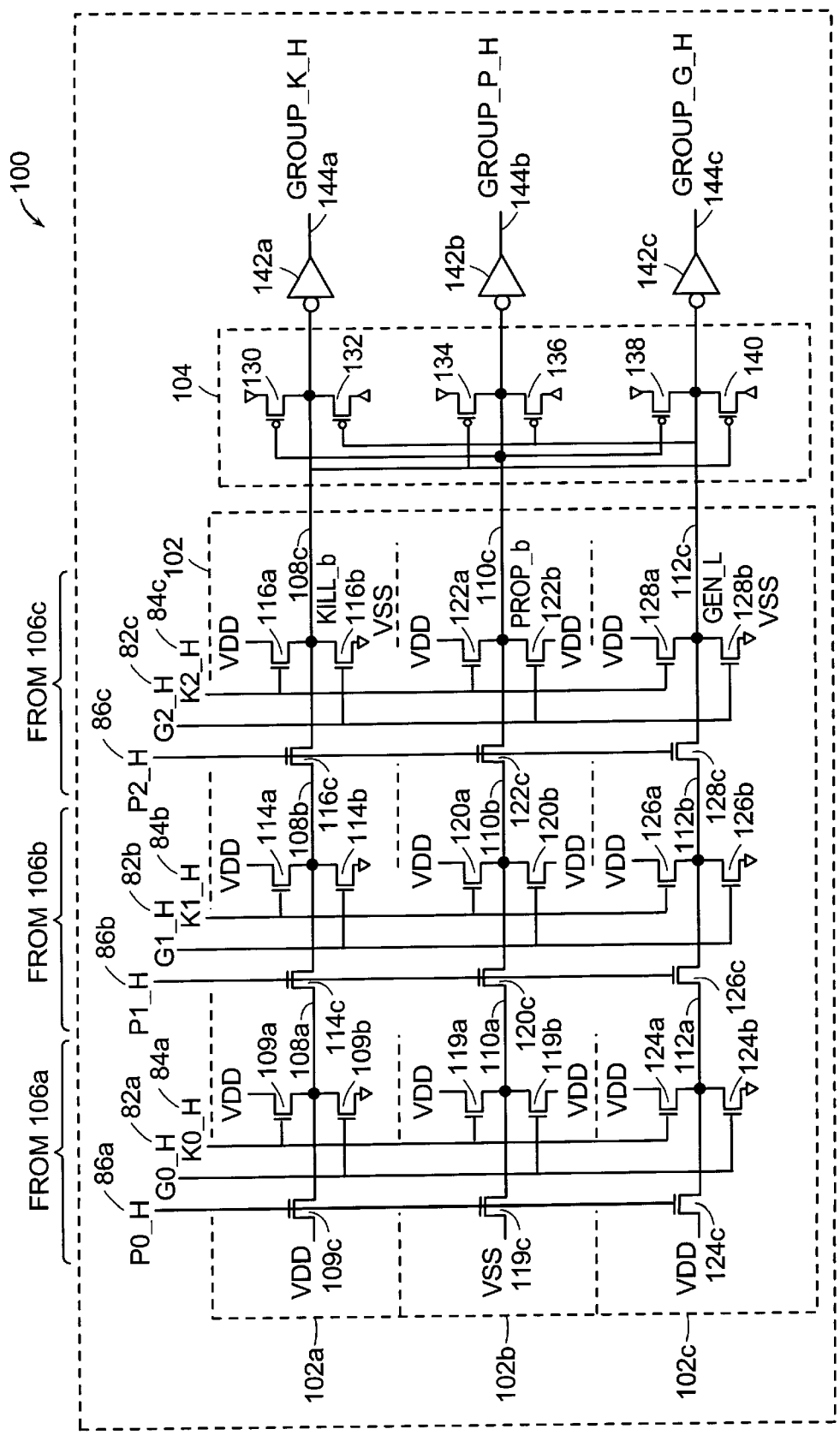
FIG. 6 is a schematic diagram of a carry lookahead circuit of the carry lookahead circuit of FIG. 4, according to the present invention.

Referring now to FIG. 6, a schematic diagram depicts carry lookahead circuit 100 implemented using the generalized push-pull cascode logic family. The NMOS logic circuits 102a–102c receive carry status signals 82–86 that are driven by adder circuits 106a–106c. Adder circuits 106a–106c can be considered as a single adder circuit when carry lookahead circuit 100 aggregates the associated carry status signals to produce overall carry status signals for the entire group.

Generally, the carry status information from adder circuit 106a causes signals 108a, 110a and 112a to assert in a mutually exclusive manner. The carry status information from adder circuit 106b allows those logic levels to be overridden, in the case of a generate or kill operation, or to be propagated to signals 108b, 110b and 112b in the case of a propagate operation. Likewise, the carry status information from adder circuit 106c causes the logic levels of signals 108c, 110c and 112c to be either overridden or propagated to output signals 108c, 110c and 112c. Accordingly, the overall carry-out status signals for the entire group are produced in stages.

Figure 7A:
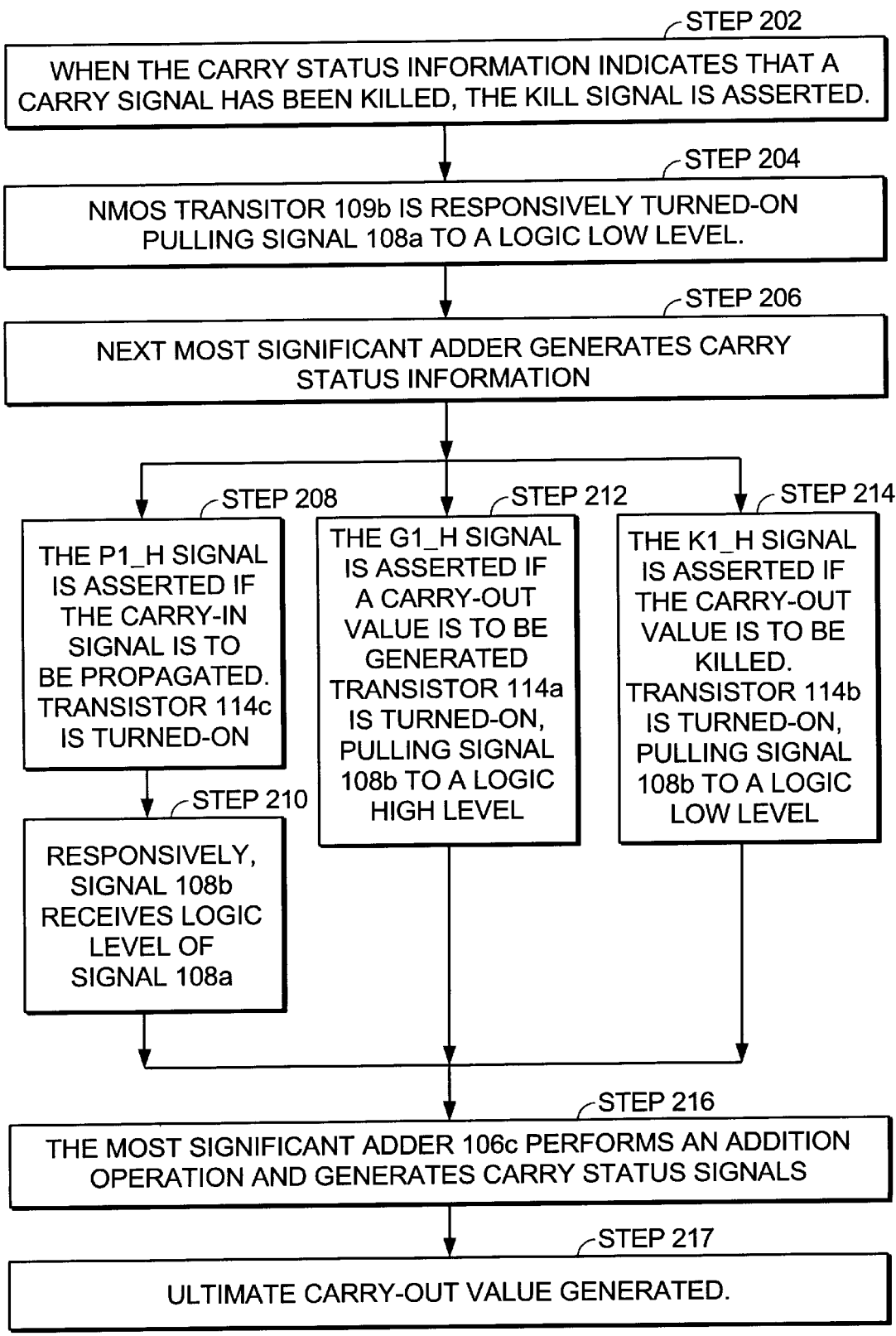
FIGS. 7A and 7B are flow diagrams of the operation of the carry lookahead circuit of FIG. 6.

More specifically, consider the operation of NMOS logic circuit 102a with respect to the flow diagram of FIG. 7A. When carry status information from the least significant partial adder circuit 106a indicates that the associated carry-out has been killed, it asserts the kill (K0_H) signal 84a and de-asserts the generate (G0_H) signal 82a and the propagate signal (P0_H) 86a (Step 202). Responsively, NMOS transistor 109b turns-on, pulling signal 108a to a logic low level (Step 204). Subsequently, assume that the next most significant adder circuit 106b performs an arithmetic operation and generates associated carry status information (Step 206). If that carry status information indicates that the received carry-in value should be propagated, then the propagate (P1_H) signal 86b is asserted, turning transistor 114c on (Step 208). Responsively, signal 108b receives the logic level of signal 108a (Step 210). In other words, the assertion of the kill signal 84a is propagated one step closer to the overall kill signal 108c.

Alternatively, if the carry status information from adder 106b indicates that a new carry-out value should be generated, transistor 114a is turned-on, pulling signal 108b to a logic high level, i.e. de-asserting it (Step 212). Likewise, if the carry status information indicates that the carry-out value should be killed, kill signal 84b is asserted, turning transistor 114b on and pulling signal 108b to a logic low level (Step 214). After the most significant partial adder circuit 106c performs its arithmetic operation, the appropriate one of associated carry status signals is asserted, either generating, killing, or propagating the carry-in value (Step 216). Accordingly, the kill portion (Group_K_H) 144a of the ultimate carry-out status signals is produced (Step 217).

The formation of the propagate portion of the ultimate carry status signals will now be discussed. The Prop_L signal 110c, is asserted only when each adder circuit 106a–106c asserts its associated propagate signal 86a–86c. That is because the Prop L signal 110c is intended to indicate that the carry-in value to adder circuit 106a is the same as the carry-out value of adder circuit 106c. Accordingly, if the carry-in and carry-out values of adder circuit 106a are the same, propagate signal 86a will be asserted. Responsively, transistor 119c is turned-on and a logic low level is developed on signal 110a. Likewise, if the carry-in and carry-out values of adder circuit 106b are the same, propagate signal 86b will be asserted. Responsively, transistor 120c is turned-on and the logic low level from signal 110a is propagated to signal 110b. Finally, if the carry-in and carry-out values of adder circuit 106c are the same, propagate signal 86c will be asserted. Responsively, transistor 122c is turned-on and the logic low level from signal 110b is propagated to signal 110c thereby asserting it. Accordingly, only when each of the propagate signals 86 is asserted will the ultimate propagate signal 110c be asserted.

The generate portion of the ultimate carry-out status signals is similarly produced. When carry status information from the least significant partial adder circuit 106a indicates that the associated carry-out is to be generated, it asserts the generate (G0_H) signal 82a and de-asserts the kill (K0_H) signal 84a and the propagate signal (P0_H) 86a. Responsively, NMOS transistor 124b turns-on, pulling signal 112a to a logic low level. Subsequently, assume that the next most significant adder circuit 106b performs an arithmetic operation and generates associated carry status information. If that carry status information indicates that the received carry-in value should be propagated, then the propagate (P1_H) signal 86b is asserted, turning transistor 126c on. Responsively, signal 112b receives the logic level of signal 112a (Step 210). In other words, the assertion of the generate signal 82a is propagated one step closer to the overall generate signal 112c.

Alternatively, if the carry status information from adder 106b indicates that the carry-in value should be killed, transistor 126c is turned-off and transistor 126a is turned-on, pulling signal 112b to a logic high level, i.e. de-asserting it. Likewise, if a new carry value should be generated, transistor 126c is turned-off and transistor 126b is turned-on, pulling signal 112b to a logic low level. After the most significant partial adder circuit 106c performs its arithmetic operation, the appropriate one of associated carry status signals is asserted, either generating, killing, or propagating the carry-in value. Accordingly, the generate portion (Group_G_H) 144c of the ultimate carry-out status signals is produced.

The output signals 108c, 110c and 112c from NMOS logic circuit 102 are conveyed to output circuit 104. Generally, output circuit 104 includes a number of PMOS transistor devices connected to each of the output signals generated by logic circuit 102. If the variable "N" represents the number of mutually exclusive output signals, then the number of PMOS transistor devices that are coupled to each of the output signals is represented by the value "N−1". In other words, each output signal is associated with a number of PMOS transistor devices that is equivalent to one less than the total number of output signals.

The present embodiment of the invention includes three mutually exclusive output signals. Accordingly, two PMOS transistors are associated with each output signal 108c, 110c and 112c. Those PMOS transistors each have a drain terminal connected to the associated output signal 108c, 110c or 112c, and a source terminal connected to the Vdd power supply voltage. Further, those PMOS transistors have gate terminals that are connected to each of the other output signals, i.e. the output signals to which they are not associated. For example, the drain terminals of transistors 130 and 132 are coupled to output signal KILL_L 108c and therefore are referred to as being associated with that output signal. Accordingly, the gate terminal of PMOS transistor 130 is connected to output signal 110c and the gate terminal of the other transistor 132 is connected to output signal 112c.

The drain terminals of transistors 134 and 136 are coupled to output signal PROP_L 110c and therefore are referred to as being associated with that output signal. Accordingly, the gate terminal of PMOS transistor 134 is connected to output signal 108c and the gate terminal of the other transistor 136 is connected to output signal 112c. In a similar manner, the drain terminals of transistors 138 and 140 are coupled to output signal GEN_L 112c and are referred to as being associated with that output signal. The gate terminal of one of the transistors 138 is connected to output signal 110c and the gate terminal of the other transistor 140 is connected to output signal 108c.

Accordingly, with such an output circuit configuration, when one of the mutually exclusive output signals 108c–112c is asserted, i.e. pulled to a logic low level, one PMOS transistor device coupled to each of the other output signals is responsively turned-on, providing a path to Vdd. Therefore, those output signals are pulled to a logic high level. The output signals can be subsequently buffered by inverters 142 before being conveyed to another logic circuit for processing.

Figure 7B:
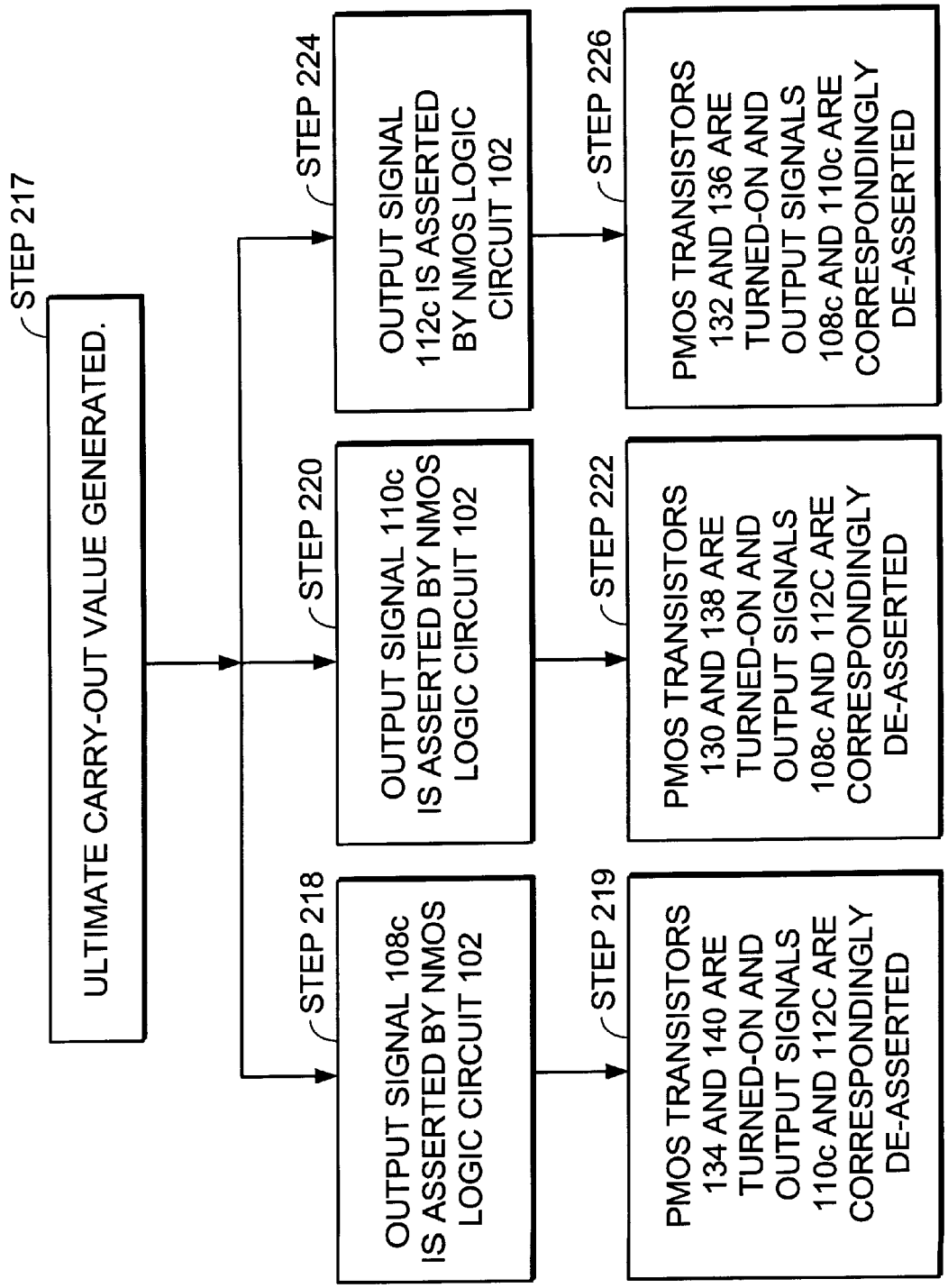

Referring to the flow diagram of FIG. 7B, the operation of output circuit 104 will be described. For illustration purposes, consider that the KILL_L output signal 108c has been asserted by NMOS logic circuit 102 (Step 218). Responsively, PMOS transistors 134 and 140 are turned-on and output signals PROP_L 110c and GEN_L 112c are correspondingly de-asserted, i.e. pulled to a logic high level (Step 219). Therefore, output circuit 104 allows one of the mutually exclusive output signals to be asserted and that assertion responsively causes the remaining output signals to be strongly de-asserted.

Similarly, when output signal PROP_L 110c is asserted (Step 220), PMOS transistors 130 and 138 are turned-on and output signals KILL_L 108c and GEN_L 112c are correspondingly de-asserted (Step 222). Likewise, when output signal GEN_L 112c is asserted (Step 224), PMOS transistors 132 and 136 are turned-on and output signals KILL_L 108c and PROP_L 110c are correspondingly de-asserted (Step 226). Accordingly, the overall carry-out value is designated by the logic levels of signals 108c–112c. Those logic levels are subsequently buffered by inverters 142a–142c in order to generate signals 144a–144c which can be conveyed to other logic circuits for processing.

It should be noted that the present embodiment requires implementation of only six PMOS transistor devices. Accordingly, such a small number of PMOS transistor devices allows the parasitic capacitance and semiconductor real estate to be minimized, thereby improving the performance of the circuit.

IV. Alternative Embodiments

Figure 8:
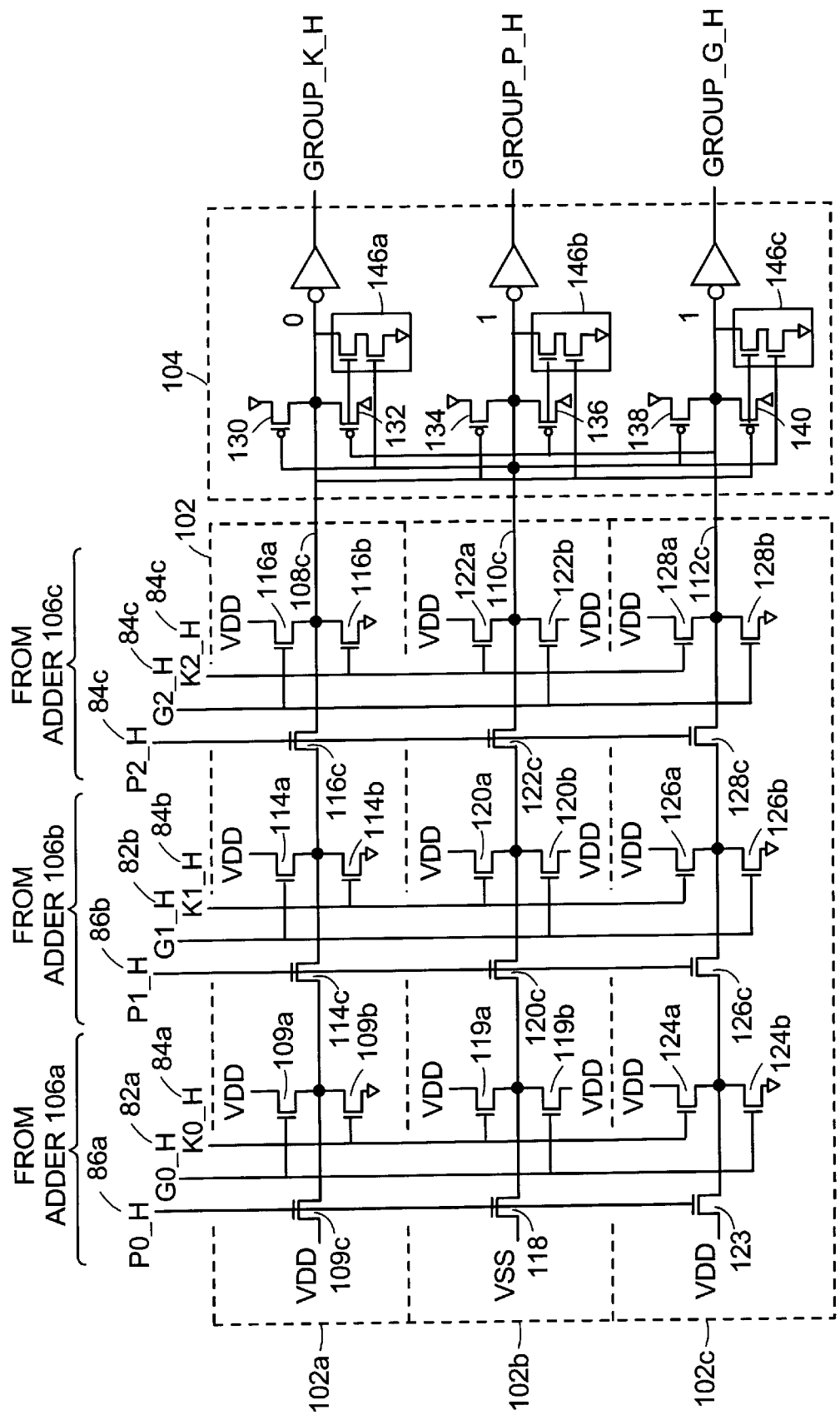
FIG. 8 is a schematic diagram of a carry lookahead and latch circuit included in the central processing unit of FIG. 2, according to the present invention.

Referring now to FIG. 8, an alternative embodiment of the generalized push-pull cascode logic family is shown to include a latching function supported by NMOS paths 146a–146c as part of output circuit 104. These NMOS paths provide immunity to electrical disturbances. Each of those NMOS paths 146a–146c include a series connection of a number of NMOS devices connected to each output signal. The number of NMOS devices is equivalent to one less than the number of mutually exclusive outputs. In other words, if the variable "N" represents the number of mutually exclusive output signals, then the number of NMOS transistor devices that are coupled to each of the output signals is equivalent to the value "N–1". In other words, the number of serially connected NMOS transistors is equivalent to the number of PMOS transistors coupled to each output signal 108c–112c. It should be noted that a number of smaller NMOS transistor devices connected in series or in parallel can be equivalent to a single NMOS transistor device described above. Likewise, a number of smaller PMOS transistor devices connected in series or in parallel can be equivalent to a single PMOS transistor device described above.

Each group of serially connected NMOS transistor devices is connected between an output signal 108c–112c to which it is associated and Vss. Each of the NMOS transistor devices includes a gate terminal that is connected to one of the other output signals in the same manner as previously described with respect to the PMOS transistor devices 130–140. Because output signals 108c–112c are asserted in a mutually exclusive manner, only one can be asserted at a time. Therefore, the NMOS transistor devices associated with the asserted output signal are turned-on in response to the logic high levels of the de-asserted output signals. The asserted output signal 108c, 110c or 112c is therefore strongly asserted, i.e. pulled to a logic low level by the NMOS devices 146. Accordingly, the output stage of the generalized push-pull cascode logic family is enhanced with improved immunity to electrical noise, such that the asserted and de-asserted output signals are maintained at their respective logic levels.

It should also be noted that to further enable the latching function, pass gates can be connected in-line with output signals 108c–112c between 109c circuit 102 and output circuit 104. The gates of those passgates can be clocked with a signal that indicates when the output signals 108c–112c should be sampled.

Figure 9:
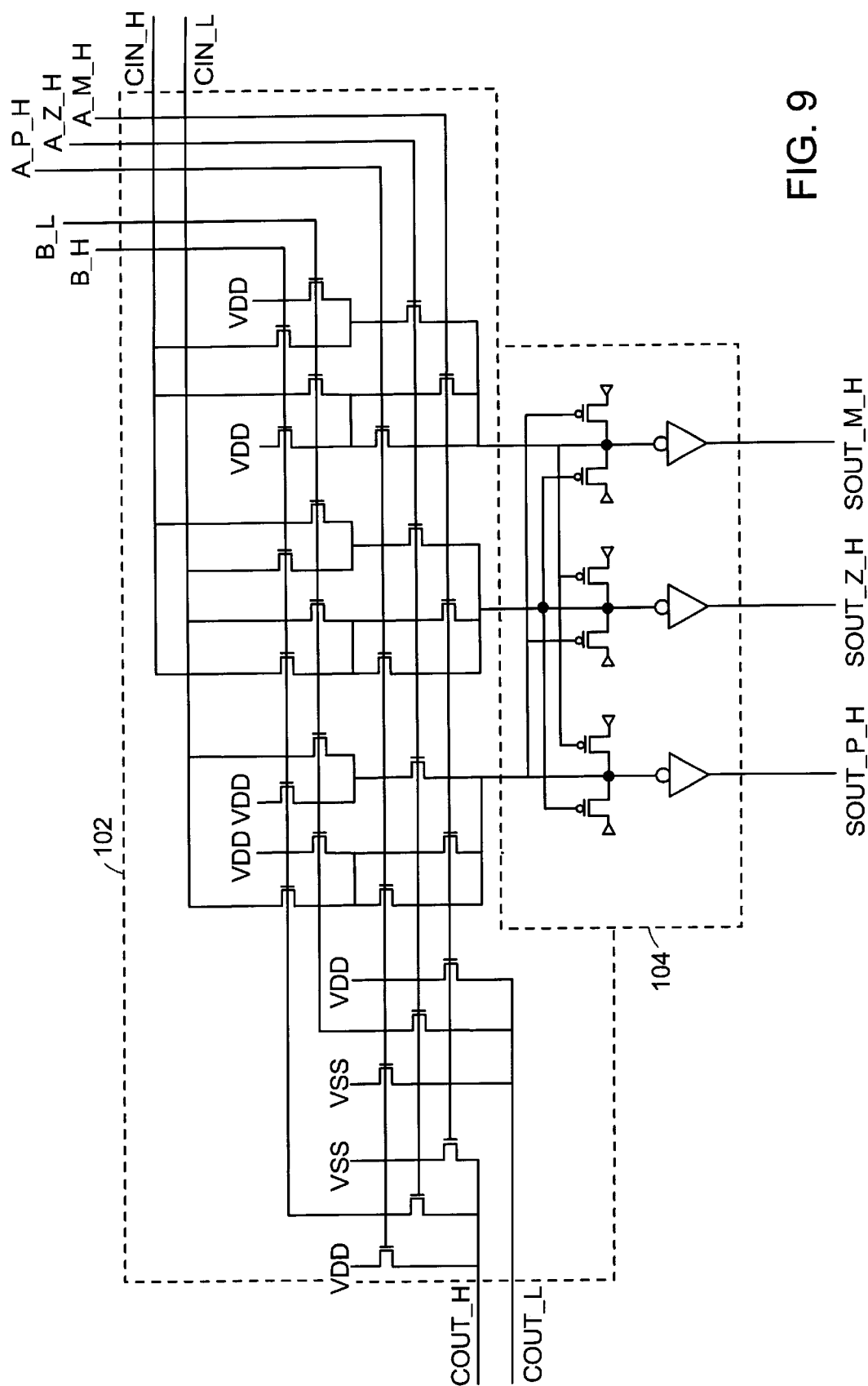
FIG. 9 is a schematic diagram of signed digit and binary adder circuit included in the central processing unit of FIG. 2, according to the present invention.

Referring now to a further embodiment of the present invention, FIG. 9 depicts a schematic diagram of an adder circuit designed using the generalized push-pull cascode logic family. Generally, the adder circuit performs an addition operation of a binary value (asserted on signal lines B_H and B_L), a signed digit value (asserted on signal lines A_P_H, A_Z_H and A_M_H) and a carry-in value from a less significant adder circuit (asserted on signal lines CIN_H and CIN_L). The addition operation is performed by the NMOS logic circuit 102 and the sum is conveyed to the output stage 104.

The resulting sum can reflect only one of three signed digit numbers: –1, 0 or +1. Therefore, when the sum is –1, output signal SOUT_M_H is pulled to a logic high level and the other output signals are pulled to logic low levels. When the sum is 0, output signal SOUT_Z_H is pulled to a logic high level and the other output signals are pulled to logic low levels. Lastly, when the sum is +1, output signal SOUT_P_H is pulled to a logic high level and the other output signals are pulled to logic low levels. In other words, the output signals are asserted in a mutually exclusive manner and hence the circuit benefits from being implemented using the generalized push-pull cascode logic family.

Likewise, output circuit 104 is implemented using PMOS transistor devices connected in the manner previously described. Therefore, a pair of PMOS transistors is coupled to each output signal. Such an implementation results in an adder circuit having increased performance characteristics due to the small number of required PMOS transistor devices.

Accordingly, a generalized push-pull cascode logic family has been described that provides efficient implementation of logic and arithmetic functions that generate mutually exclusive output signals. The generalized push-pull cascode logic family includes a network of NMOS transistors that implement a desired logic function. Coupled to that network is a minimal number of PMOS devices for providing logic level restoration and for compensating for any voltage drops due to the NMOS transistors. When a logic function is implemented using such a structure, the speed, area and power consumption drawbacks of prior art logic families are overcome.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An apparatus for generating a set of mutually exclusive output signals, comprising:

a network of NMOS devices that implement a desired logic function, said network generating a number of output signals that are asserted in a mutually exclusive manner; and a configuration of PMOS devices, each of said PMOS devices being associated with one of said output signals for raising ones of said output signals to logic high levels, said configuration comprising a number of PMOS devices, said number being equivalent to one less than the number of said output signals, each of said PMOS devices comprising a gate terminal coupled to each of said output signals except the output signal to which it is associated.

2. The apparatus for generating a set of mutually exclusive output signals as described in claim 1, wherein each of said PMOS devices comprises a drain terminal coupled to said associated output signal.

3. The apparatus for generating a set of mutually exclusive output signals as described in claim 2 wherein each of said PMOS devices comprises a source terminal coupled to a supply voltage indicative of a logic high level.

4. The apparatus for generating a set of mutually exclusive output signals as described in claim 3, wherein each of said output signals are connected to a logic gate for buffering said output signals before they are conveyed to another logic circuit.

5. The apparatus for generating a set of mutually exclusive output signals, as described in claim 1, further comprising:
   a number of latch devices, each associated with one of said output signals, for pulling an asserted one of said output signals to a logic low level.

6. The apparatus for generating a set of mutually exclusive output signals, as described in claim 5, wherein said latches comprise:
   a number of NMOS devices connected in a series manner, said number of NMOS devices being equivalent to one less than the number of said output signals.

7. The apparatus for generating a set of mutually exclusive output signals as described in claim 6, wherein said NMOS devices of said latches each comprise a gate terminal coupled to each of said output signals except the output signal to which it is associated.

8. The apparatus for generating a set of mutually exclusive output signals as described in claim 7, wherein said number of output signals is three and wherein said serially connected NMOS devices comprise:
   a first NMOS device having a drain terminal coupled to said associated output signal;
   a second NMOS device having a drain terminal corrected to a source terminal of said first NMOS device and a source terminal coupled to an electronic ground.

9. The apparatus for generating a set of mutually exclusive output signals, as described in claim 7 wherein said number of said output signals is greater than three and wherein said serially connected NMOS devices comprise:
   a first NMOS device having a drain terminal coupled to said associated output signal;
   a second NMOS device having a source terminal coupled to an electronic ground
   at least one NMOS device serially connected between a source terminal of said first NMOS device and a drain terminal of said second NMOS device.

10. The apparatus for generating a set of mutually exclusive output signals, as described in claim 1, wherein said network of NMOS devices implements a logic function for aggregating carry status signals from a plurality of adder circuits.

11. The apparatus for generating a set of mutually exclusive output signals, as described in claim 10, wherein said carry status signals indicate propagate, generate and kill status of an associated carry signal wherein only one of said carry status signals can be asserted at a time.

12. A computer system, comprising:
   a central processing unit connected to a memory system by a system bus;
   an I/O system, connected to the system bus by a bus interface device; and
   a logic function, implemented within said central processing unit, comprising a network of NMOS devices said network generating a number of output signals that are asserted in a mutually exclusive manner, said logic function further comprising a configuration of a number of PMOS devices, each of said PMOS devices being associated with one of said output signals for raising ones of said output signals to logic high levels, said number being equivalent to one less than the number of said output signals, each of said PMOS devices comprising a gate terminal coupled to each of said output signals except the output signal to which it is associated.

13. The computer system described in claim 12 wherein each of said PMOS devices comprises a drain terminal coupled to said associated output signal.

14. The computer system described in claim 13 wherein each of said PMOS devices comprises a source terminal coupled to a power supply voltage indicative of a logic high level.

15. The computer system described in claim 14, wherein each of said output signals are connected to a logic gate buffering said output signals before they are conveyed to another logic circuit.

16. The computer system described in claim 12, further comprising:
   a number of latch devices, each associated with one of said output signals, for pulling an asserted one of said output signals to an asserted logic level.

17. The computer system described in claim 16, wherein said latches comprise:
   a series connection of a number of NMOS devices, said number of NMOS devices being equivalent to one less than the number of said output signals.

18. The computer system described in claim 17, wherein said number of NMOS devices of said latches each comprise a gate terminal coupled to each of said output signals except the output signal to which it is associated.

19. The computer system described in claim 18, wherein said number of said output signals is three and wherein said serially connected NMOS devices comprise:
   a first NMOS device having a drain terminal coupled to said associated output signal;
   a second NMOS device having a drain terminal connected to a source terminal of said first NMOS device and a source terminal coupled to an electronic ground.

20. The computer system described in claim 18 wherein said number of said output signals is greater than three and wherein said serially connected NMOS devices comprise:
   a first NMOS device having a drain terminal coupled to said associated output signal;
   a second NMOS device having a source terminal coupled to an electronic ground; and
   at least one NMOS device serially connected between a source terminal of said first NMOS device and a drain terminal of said second NMOS device.

21. The computer system described in claim 12, wherein said network of NMOS devices implements a logic function for aggregating carry status signals from a plurality of arithmetic logic circuits.

22. The computer system described in claim 21, wherein said carry status signals indicate propagate, generate and kill status of an associated carry signal wherein only one of said carry status signals can be asserted at a time.

23. A method for implementing a logic circuit to generate a set of mutually exclusive output signals, comprising the steps of:
   designing said logic circuit to implement a desired logic function that generates said mutually exclusive output signals in response to input signals conveyed to said logic circuit, said logic circuit designed using NMOS devices;

associating a number of PMOS devices with each of said mutually exclusive output signals, said number of PMOS devices being one less than the number of said mutually exclusive output signals; and connecting each gate terminal of said PMOS devices that are coupled to a given one of said mutually exclusive output signals, to a different one of the other mutually exclusive output signals.

24. The method for implementing a logic circuit to generate a set of mutually exclusive output signals, as described in claim 23, further comprising the steps of:

connecting a source terminal of said PMOS devices that are coupled to said given one of said mutually exclusive output signals to a supply voltage indicative of a logic high level; and connecting a drain terminal of said PMOS devices to said given one of said mutually exclusive output signals to which they are associated.

25. The method implementing a logic circuit to generate a set of mutually exclusive output signals, as described in claim 24, further comprising the steps of:

serially connecting an NMOS path between each of said mutually exclusive output signals and an electronic ground for maintaining one of said mutually exclusive output signals at a logic low level; and coupling a buffer to each of said mutually exclusive output signals.

26. The method for implementing a logic circuit to generate a set of mutually exclusive output signals, as described in claim 25 wherein each of said paths includes a number of NMOS transistors connected in series, said number of NMOS transistors being equivalent to one less than the number of said mutually exclusive output signals.

27. The method for implementing a logic circuit to generate a set of mutually exclusive output signals, as described in claim 26 further comprising the step of connecting a gate terminal of each of said NMOS devices, comprising a path that is associated with a given one of said mutually exclusive output signals, to a different one of the other mutually exclusive output signals.

28. The method for implementing a logic circuit to generate a set of mutually exclusive output signals, as described in claim 23, wherein said logic circuit receives carry-status information from a number of arithmetic logic circuits and generates a set of mutually exclusive output signals that are asserted in response to said carry-status information.

29. The method for implementing a logic circuit to generate a set of mutually exclusive output signals, as described in claim 28, wherein said carry status information indicates whether a carry signal from each of said arithmetic logic circuits has been killed, generated or propagated.

30. The method for implementing a logic circuit to generate a set of mutually exclusive output signals, as described in claim 29, wherein said logic circuit aggregates the carry-status information from said arithmetic logic circuits such that the status of an overall carry signal can be determined.

31. An apparatus comprising:

a means for asserting ones of a group of output signals in a mutually exclusive manner, said means implemented by a network of NMOS transistor devices; and a means for raising de-asserted ones of said output signals to de-asserted logic levels, said means implemented by a configuration comprising a number of PMOS devices, said number being equivalent to one less than the number of said output signals, each of said PMOS devices comprising a gate terminal coupled to each of said output signals except the output signal to which it is associated.

32. The apparatus as described in claim 31, wherein each of said PMOS devices comprises a drain terminal coupled to said associated output signal.

33. The apparatus as described in claim 32 wherein each of said PMOS devices comprises a source terminal coupled to a supply voltage indicative of a logic high level.

34. The apparatus as described in claim 33, wherein each of said output signals are connected to an inverter for buffering said output signals before they are conveyed to another logic circuit.

35. The apparatus, as described in claim 31, further comprising:

a number of latch devices, each associated with one of said output signals, for maintaining an asserted one of said output signals at an asserted logic level.

36. The apparatus, as described in claim 35, wherein said latches comprise:

a series connection of a number of NMOS devices, said number of NMOS devices being equivalent to one less than the number of said output signals.

37. The apparatus as described in claim 36, wherein said number of NMOS devices of said latches each comprise a gate terminal coupled to each of said output signals except the output signal to which it is associated.

38. The apparatus as described in claim 37, wherein said number of said output signals is three and wherein said serially connected NMOS devices comprise:

a first NMOS device having a drain terminal coupled to said associated output signal;

a second NMOS device having a drain terminal connected to a source terminal of said first NMOS device and a source terminal coupled to an electronic ground.

39. The apparatus, as described in claim 37 wherein said number of said output signals is greater than three and wherein said serially connected NMOS devices comprise:

a first NMOS device having a drain terminal coupled to said associated output signal;

a second NMOS device having a source terminal coupled to an electronic ground; and at least one NMOS device serially connected between a source terminal of said first NMOS device and a drain terminal of said second NMOS device.

40. The apparatus, as described in claim 31, wherein said network of NMOS devices implements a logic function for aggregating carry status signals from a plurality of arithmetic logic circuits.

41. The apparatus, as described in claim 40, wherein said carry status signals indicate propagate, generate and kill status of an associated carry signal wherein only one of said carry status signals can be asserted at a time.

42. The apparatus, as described in claim 41, wherein each of said output signals are associated with one type of said carry status signals and are asserted to indicate a status of a carry signal generated by the aggregation of said plurality of arithmetic logic circuits.

* * * * *